July 6, 1948.   C. E. MOSLEY   2,444,745
CIRCUIT CONTROL APPARATUS
Filed Dec. 26, 1944    3 Sheets-Sheet 1
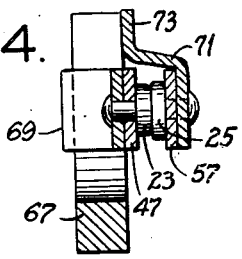
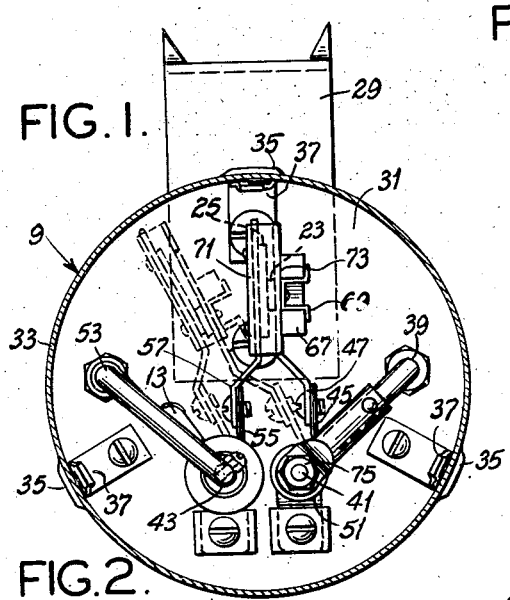
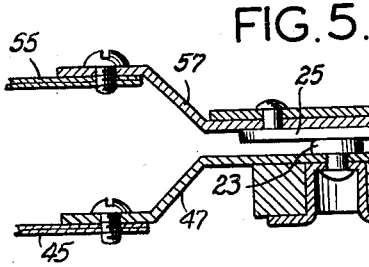
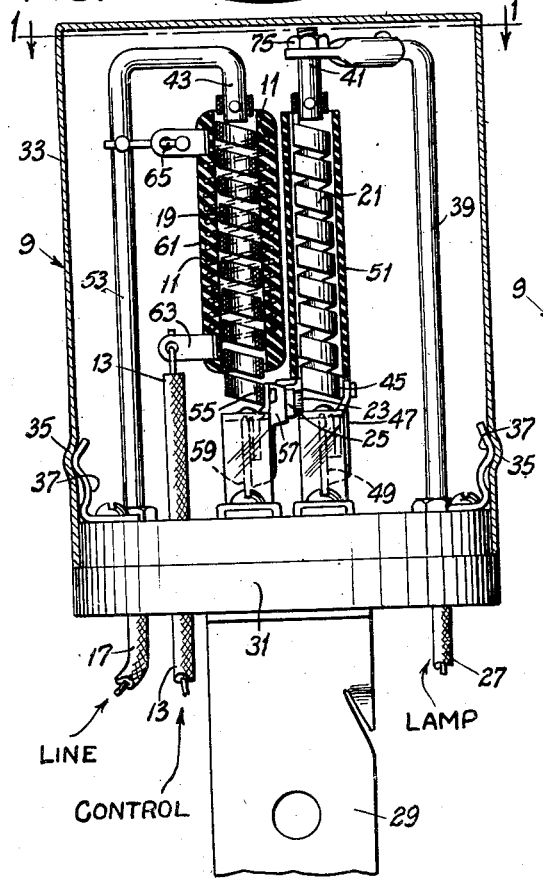
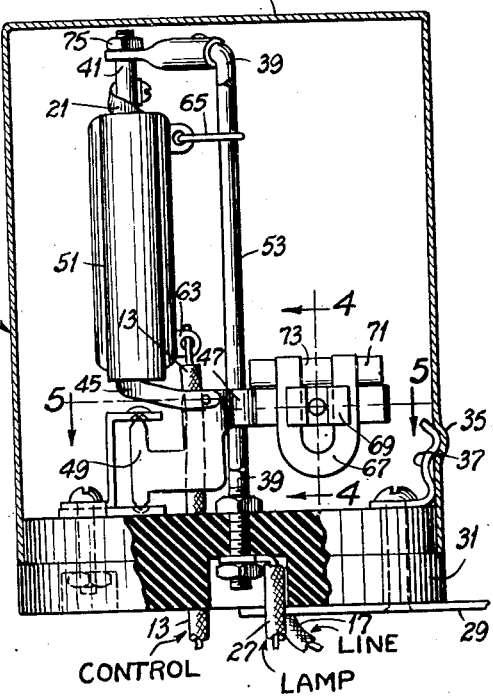
Carl E. Mosley,
Inventor.
Haynes and Koenig,
Attorneys.

July 6, 1948.　　　C. E. MOSLEY　　　2,444,745
CIRCUIT CONTROL APPARATUS
Filed Dec. 26, 1944　　　3 Sheets-Sheet 2

Carl E. Mosley,
Inventor.
Haynes and Koenig,
Attorneys.

July 6, 1948.  C. E. MOSLEY  2,444,745
CIRCUIT CONTROL APPARATUS
Filed Dec. 26, 1944  3 Sheets-Sheet 3

Carl. E. Mosley,
Inventor.
Haynes and Koenig
Attorneys.

Patented July 6, 1948

2,444,745

UNITED STATES PATENT OFFICE 2,444,745

CIRCUIT CONTROL APPARATUS

Carl E. Mosley, Overland, Mo., assignor to W. N. Matthews Corporation, St. Louis, Mo., a corporation of Missouri Application December 26, 1944, Serial No. 569,687

1 Claim. (Cl. 315—362)

This invention relates in general to circuit-control apparatus, and with regard to certain more specific features, to manually-controlled relays for street-lighting circuits.

Among the several objects of the invention may be noted the provision of a simple, convenient and reliable group control for street-lighting and like circuits which will not interfere with customer service or independent control of other groups; the provision of a control of the type described which is compensated for changes in ambient temperature conditions so that it is equally effective throughout the seasons; the provision of a device of the class described which includes suitable snap-acting contacts to reduce contact corrosion such as is due to arcing; and the provision of a device of this class which is economical to construct and maintain. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which are illustrated several of various possible embodiments of the invention, Fig. 1 is a horizontal section taken on line 1—1 of Fig. 2;

Fig. 2 is a side elevation of the device, parts being shown in section;

Fig. 3 is a right-side elevation of Fig. 2, parts being shown in section;

Fig. 4 is an enlarged vertical and detail section taken on line 4—4 of Fig. 3;

Fig. 5 is an enlarged horizontal and detail section taken on line 5—5 of Fig. 3;

Similar reference characters indicate corresponding parts throughout the several views of the drawings.

A street-lighting circuit is used in the present description as an example of a type of circuit which may be controlled by the present invention, but it is not to be taken as limiting. However, the advantages of the invention are particularly desirable in such circuits.

Figure 6:
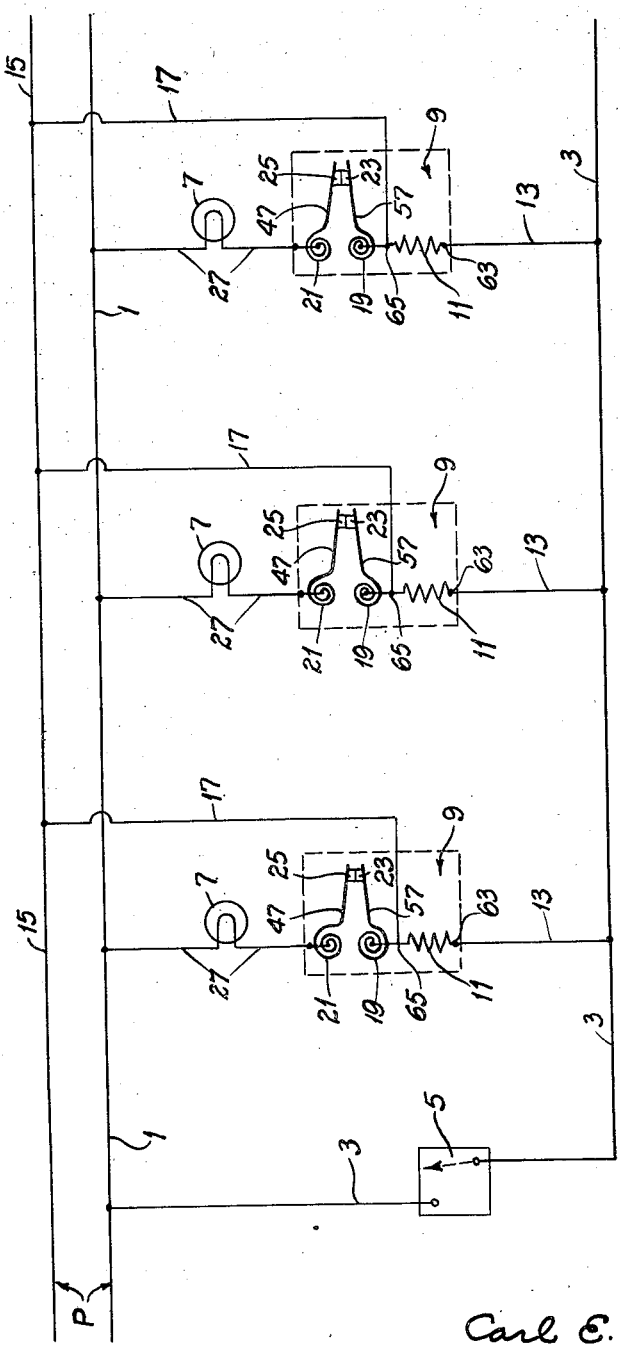
Fig. 6 is a wiring diagram of one form of the invention.

Referring now more particularly to Fig. 6, there is shown at P a 120-volt portion of an ordinary 120–240-volt single-phase three wire distribution power circuit. Connected to lead 1 of this circuit is a pilot wire 3 which forms a circuit through a manual control switch 5 and other parts to be described. At numerals 7 are shown typical light bulbs connected on the same side to said lead 1. It will be understood that the lamps 7 are exemplary of any power-translating apparatus supplied by the power line P. On the other side, each bulb 7 is connected to a relay control unit 9. One unit 9 is associated with each lamp 7. Each unit 9 includes a resistant heater wire 11 which is connected by a wire 13 to the pilot wire 3. The other side of each heater 11 is connected to the other side 15 of the circuit P by means of a wire 17. This wire 17 also connects the respective lamp 7 across the line P. Thus whenever the manual switch 5 is closed, all of the heaters 11 are energized and heated. When the switch 5 is opened, the heaters 11 are deenergized and cold. It will be understood that although the switch 5 is, in the present example, manually controlled, an automatically controlled switch may be used in its place.

Each heater 11 is also connected to the lead 1 through bimetallic thermostats 19, 21, contacts 23 and 25 and by wire 27 passing through the respective lamp 7. Each heater 11 selectively heats only one thermostat 19 which opens the contacts 23 and 25 to break the circuit which would otherwise occur through 17, 19, 23, 25, 21, 27 and a lamp 7. Thus whenever the switch 5 is closed, the lamps 7 are extinguished. Whenever switch 5 is open, the lights 7 are lighted.

Significant details of the units 9 are shown in Figs. 1–5. Each consists of a support 29 for an insulating base 31. The base 31 carries a protective cover 33 underneath which are the control parts. The cover is removably held in place by means of a groove 35 and cooperating spring catches 37.

The operating parts comprise a conductor post 39 connected with the wire 27 from a lamp 7. Supported from a depending stud 41 on this post 39 is a bimetallic thermostatic helix 21, which has a lower free depending end 45 attached to a sweep arm 47. The latter may sweep horizontally by reason of a vertical pivotal mount on the base indicated at 49. The helix 21 is heat-insulated by means of a heat-insulating fibre tube 51. Angular adjustment is provided for by threads and a nut 75.

At numeral 53 is shown a second conducting post connected to the line wire 17. This post 53 has a thermostat 19 attached to a depending part 43. The thermostat 19 is also made up as a bimetallic helix. The lower free end 55 of this helix is attached to a second sweep arm 57 which may sweep horizontally by virtue of a vertical pivot on the base shown at 59.

Surrounding the thermostatic element 19 is the heater coil 11, which is embedded in an insulating cylinder 61. The lead 13 from the control wire 3 is attached to the lower end of the heater at 63. The other end of the heater 11 is in conductive relation to the post 53 through contact 65.

It will be seen that the above mechanical construction carries out the circuit shown in Fig. 6. It also provides for selectively heating the thermostatic element 19.

As indicated in the drawings, it is preferable that the respective axes of the thermostats 19 and 21 be coaxial with the axes of the pivotal connections 59 and 49, respectively. Thus the rotary, twisting actions of the thermostats in response to temperature changes are transmitted to the rotary arms without undue lateral deflecions or bending of the thermostats.

The thermostatic elements 19 and 21 are each made with the same temperature-displacement characteristics. This is most easily accomplished by having them made of the same sizes and kinds of bimetallic strip materials wherein the numbers of windings in the respective helices are the same. The result will be that the sweep arms 57 and 47 will have equal angular movements for equal temperature changes in the thermostatic elements 19 and 21.

As above stated, when the heater 11 is cold the contacts 23 and 25 are closed. The latter are shown in Fig. 5 as being riveted to the ends of the arms 47 and 57, respectively. The contact 25 is long enough so that relative sliding action with contact 23 is accommodated. This is necessary so that they will not break contact as the arms 47 and 57 swing equiangularly. Thus under substantially equal ambient temperature variations and substantial equal swings of the arms 47, 57, the contacts will not break. This is illustrated by the dotted lines in Fig. 1. When the thermostatic element 19 is locally heated by the heater 11, the arm 47 withdraws relatively from the arm 57 and thus separates the contacts 23 and 25. In order that this contact break, and also reclosing of the contacts, may be sudden, a quick-break device is employed. This is composed of a horse-shoe magnet 67, held to the arm 47 by means of a U-clamp 69. The clamp is held to the arm 47 by the same rivet that holds the contact 23. Also, a magnetic armature 71 is held to the arm 57 by means of the same rivet that holds the contact 25. This armature 71 is bent at its upper part 73 so that it is in contact with the poles of the magnet 67 when the contacts 23 and 25 are closed.

Under differential heating of the thermostats 19 and 21 and a tendency to withdraw the arm 57 from arm 47, the withdrawal will be delayed by the holding action of the magnet 67 on the armature 73. The inherent springiness in the helically-wound thermostats allows this. Then at a predetermined stress due to twist in the thermostat 19, the pull of the magnet will be overcome with a snap action which quickly withdraws the contact 23 from the contact 25. Also, upon approach of the arm 47 toward the arm 57, a point is reached at which the influence of the magnet becomes suddenly overpowering and closes the contacts 23 and 25 with a snap action. The resilience in the two thermostatic elements 19 and 21 allows the snap movements.

Operation is as follows, referring to one unit 9 and one lamp 7:

When the manual control switch 5 is open, the heater 11 is cold. Therefore the thermostats 19 and 21 come to the same temperature according to the prevailing ambient temperature condition. This causes closure of the contacts 23 and 25. As the ambient temperature condition changes, the thermostatic elements operate in unison to swing the arms 47 and 57 while wiping the contacts 23 and 25, which remain closed.

When the switch 5 is closed, regardless of the angular positions of the arms 47 and 57, the heaters 11 locally heat the thermostat 19, the thermostat 21 being protected from this heat. As a consequence, the arm 57 is biased from the arm 47 by stress built up in the flexible helix 19, and finally when the pull of the magnet 67 on the armature 71 has been overcome, the contacts open with snap action. In other words, contact 25 angularly outruns contact 23. Thereafter they remain open as long as the switch 5 is closed, regardless of any changes in the ambient temperature. Any change in ambient temperature simply equiangularly swings the separated arms 47 and 57.

Advantages of the invention are that only a single pilot wire 3 needs to be strung out to the lamps 7. Also, the lights may be turned on and off without affecting the line P which may serve customers or other groups of lights. The amount of current used by the heaters 11 is negligible since the thermostats require little heat for actuating them. The device may be put into initial working adjustment by rotation of the stem 41 which may be clamped in any adjusted position by means of the clamp nut 75.

It will be understood that one of the units 9 is preferably placed near its respective control lamp, as by mounting it on the pole which supports the lamp in the case of a street-lighting circuit. It will also be understood that instead of the normal condition of the contacts 23 and 25 being closed when the heater is cold, they may be made to close when the heater is hot and to open when the heater is cold. This may be done by having contacts 23 and 25 so arranged that instead of contact 25 outrunning contact 23 upon differential heating (heater turned on), it overruns it upon differential cooling (heater turned off). The operation is then simply the reverse of that above described.

The cross section of the bimetallic thermostat 19 in Fig. 2 is diagrammatic. It will be understood that it is made of the usual composite metallic strip of which the components have unequal coefficients of expansion.

Figure 7:
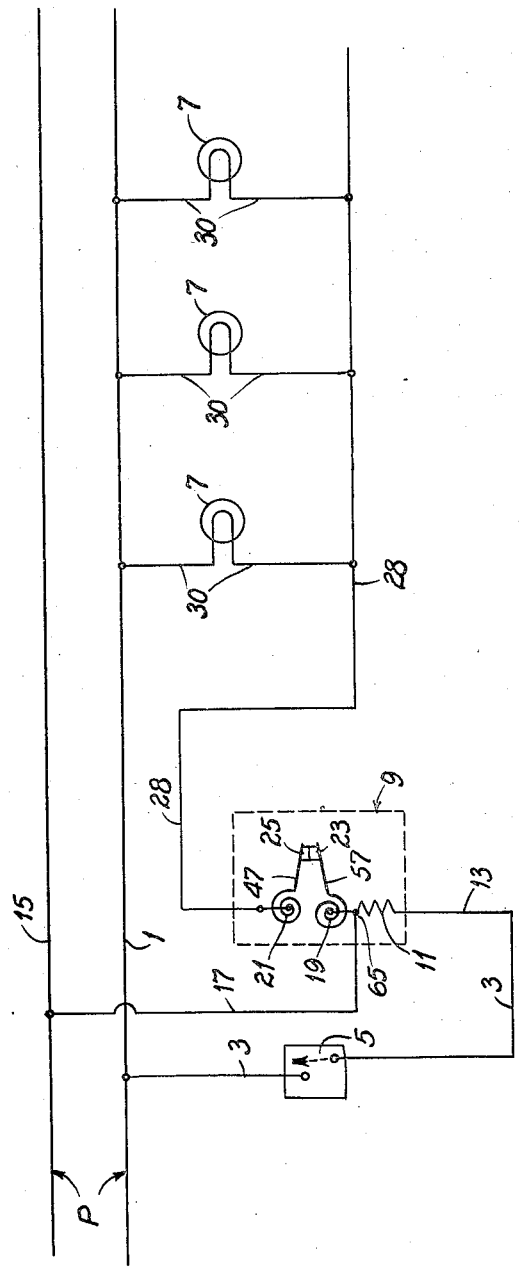
Fig. 7 is a wiring diagram of an alternative form of the invention.

In Fig. 7 is shown a wiring diagram for an alternative form of the invention in which like numerals designate like parts. In this form a unit 9 serves several lamps 7, although it is to be understood that several units 9 may be employed, each serving one or several lamp groups. Each unit 9, in this case, carries a lead 28 from thermostat 21 which feeds several lamps 7 in parallel over parallel connections 30 to wire 1. In this case the units 9 are of course designed with proper capacity for the several lamps.

Reference under Rule 43 is made to my copending application for Circuit control apparatus, Serial No. 679,347, filed June 26, 1946.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

A system for controlling lamps of a street-lighting circuit exposed to local temperature changes throughout its length, comprising a pilot line extending substantially along said circuit and fed from one side thereof, a control switch in said pilot line, control units located at intervals along said circuit and the pilot line, each control unit comprising a thermostatic switch in a lamp connection and adapted to control at least one but less than all of the lamps in the circuit, temperature-compensating means associated with each thermostatic switch in its respective unit preventing operation thereof in response to change in ambient temperature, each unit also including an electric heater connected between said pilot line and the other side of said circuit and adapted to operate the respective switch, whereby all of the heaters in all units respond to actuation of said control switch but a lamp responds only to the actuation of the thermostatic switch of the unit connected therewith.

CARL E. MOSLEY.

REFERENCES CITED

The following references are of record in the file of this patent:

UNITED STATES PATENTS

| Number | Name | Date |
|---|---|---|
| 342,549 | Ward and Jenks | May 25, 1886 |
| 485,287 | MacKay | Nov. 1, 1892 |
| 1,535,360 | Vickery | Apr. 28, 1925 |
| 1,783,904 | Carter et al. | Dec. 2, 1930 |
| 1,905,226 | Hoard | Apr. 25, 1933 |
| 2,057,384 | Lamb | Oct. 13, 1936 |
| 2,125,765 | Butler | Aug. 2, 1938 |
| 2,180,701 | Wilson | Nov. 21, 1939 |
| 2,216,556 | McGrath | Oct. 1, 1940 |
| 2,300,901 | Armstrong | Nov. 3, 1942 |
| 2,394,372 | Eaton | Sept. 4, 1945 |